(12) United States Patent
Eggert et al.

(10) Patent No.: US 6,222,342 B1
(45) Date of Patent: Apr. 24, 2001

(54) JUMP START BATTERY PACK AND ENCLOSURE THEREFOR

(75) Inventors: Daniel M. Eggert; Michael R. Mowry, both of Kenosha; Matthew M. Crass, Pleasant Prairie; Thomas P. Becker, Kenosha, all of WI (US)

(73) Assignee: Snap-on Technologies, Inc., Lincolnshire, IL (US)

( * ) Notice: Subject to any disclaimer, the term of this patent is extended or adjusted under 35 U.S.C. 154(b) by 0 days.

(21) Appl. No.: 09/628,095

(22) Filed: Jul. 28, 2000

(51) Int. Cl.[7] .............................. H02J 7/00; H02M 2/02; H01R 3/00
(52) U.S. Cl. .................. 320/105; 320/112; 307/66; D13/103; D13/107
(58) Field of Search .................................... 320/103, 104, 320/105, 112; D13/DIG. 34, 103, 107, 109; 307/64, 66; 429/170; 439/500; 60/721

(56) References Cited

U.S. PATENT DOCUMENTS

| | | |
|---|---|---|
| D. 300,920 | 5/1989 | Gierke . |
| D. 316,397 | 4/1991 | Herbert . |
| D. 321,680 | 11/1991 | Blount et al. . |
| D. 334,560 | 4/1993 | Wilson . |
| D. 364,602 | 11/1995 | Qualls et al. . |
| D. 374,859 | 10/1996 | Guay et al. . |
| D. 393,446 | 4/1998 | Bellofatto et al. . |
| D. 407,065 | 3/1999 | Chang . |
| D. 413,098 | 8/1999 | Dayan . |
| D. 417,429 | 12/1999 | Brezovar et al. . |
| D. 420,324 | 2/2000 | Wan . |
| 3,165,689 | 1/1965 | Hughes . |
| 4,392,661 | 7/1983 | Langenstein . |
| 5,220,269 | 6/1993 | Chen et al. . |
| 5,589,292 | * 12/1996 | Rozon ................................ 429/170 |
| 5,637,978 | 6/1997 | Kellett et al. . |
| 5,681,668 | * 10/1997 | Reed et al. ......................... 429/100 |
| 5,955,866 | 9/1999 | Peng . |
| 5,982,138 | 11/1999 | Krieger . |
| 5,993,983 | 11/1999 | Rozon . |
| 5,998,961 | 12/1999 | Brown . |
| 6,002,235 | 12/1999 | Clore . |

* cited by examiner

Primary Examiner—Shawn Riley
Assistant Examiner—Gregory J Toatley, Jr.
(74) Attorney, Agent, or Firm—Seyfarth Shaw

(57) ABSTRACT

A portable battery jump start unit includes a portable, plastic, clamshell-type housing including a box-like open-top base and a box-like, open-bottom cover hingedly connected together for movement between open and closed conditions. A lead-acid battery is disposed in the housing, along with a state-of-charge monitoring circuit connected to the battery terminals and including a visible indicator viewable through an aperture in the housing. Cables are connected to the battery terminals and respectively extend through openings formed by cooperating notches in the mating edges of the base and cover, the cables respectively having clamp connectors at their distal ends which can be clamped onto posts projecting laterally outwardly from the sides of the base. A charger jack in the base is connected to the battery terminals for receiving a charger connector.

21 Claims, 5 Drawing Sheets

JUMP START BATTERY PACK AND ENCLOSURE THEREFOR

BACKGROUND

This application relates to portable battery pack units, and particularly to battery packs of the type used for jump starting automotive vehicles.

Various types of portable battery packs have heretofore been provided, including batteries disposed in portable carrying cases. These cases are typically specifically designed for the particular battery pack and often are provided with access panels or hatches for accessing the interior of the housing. One such battery pack is disclosed in U.S. Pat. No. 6,002,235, and includes cables projecting outwardly through openings in the housing and terminated in connector clamps which, when not in use, can be clamped onto posts projecting laterally outwardly from the case. Access to the inside of the housing requires the removal of a panel by removing a number of screws.

It is also known to provide clamshell-type or valise-type cases for various other types of applications, and at least one battery pack for use in starting airplane engines has been provided in a clamshell-type case.

SUMMARY

The present application is directed to a battery pack which is housed in a case which provides simple and easy access to the contents, but which is fully operable in the closed condition.

An aspect of the battery pack unit is that it is provided with monitoring circuitry which permits viewing of the state of charge of the battery from outside the case and/or viewing of the verification that the unit is charging. The circuitry also permits audible verification of the state of charge of the battery as well as certain overcharge conditions.

Another aspect is the provision of cables carried by the housing and with connector clamps mountable on the outside of the housing when not in use.

Another aspect is the provision of a charger port accessible when the housing is closed.

Still another aspect is the provision of a housing of the type set forth for use with a battery pack.

Certain ones of these and other aspects may be provided in a portable battery jump start unit comprising: a portable clamshell-type housing having a base and a cover hingedly connected together for movement between open and closed conditions and cooperating to define an interior space, a battery disposed in the interior space and having terminals, monitoring circuitry including a printed-circuit board disposed in the interior space and connected to the battery terminals and including a visible indicator, an aperture in the housing disposed for viewing the visible indicator therethrough, two cable openings in the housing, two cables respectively connected to the battery terminals and extending outwardly through the openings, two clamp connectors respectively connected to distal ends of the cables outside the housing, and a charger jack in the housing connected to the battery terminals and adapted for connection to an associated charger connector while the housing is in its closed condition.

BRIEF DESCRIPTION OF THE DRAWINGS

For the purpose of facilitating an understanding of the subject matter sought to be protected, there are illustrated in the accompanying drawings preferred embodiments thereof, from an inspection of which, when considered in connection with the following description, the subject matter sought to be protected, its construction and operation, and many of its advantages should be readily understood and appreciated.

DETAILED DESCRIPTION

Figure 1:
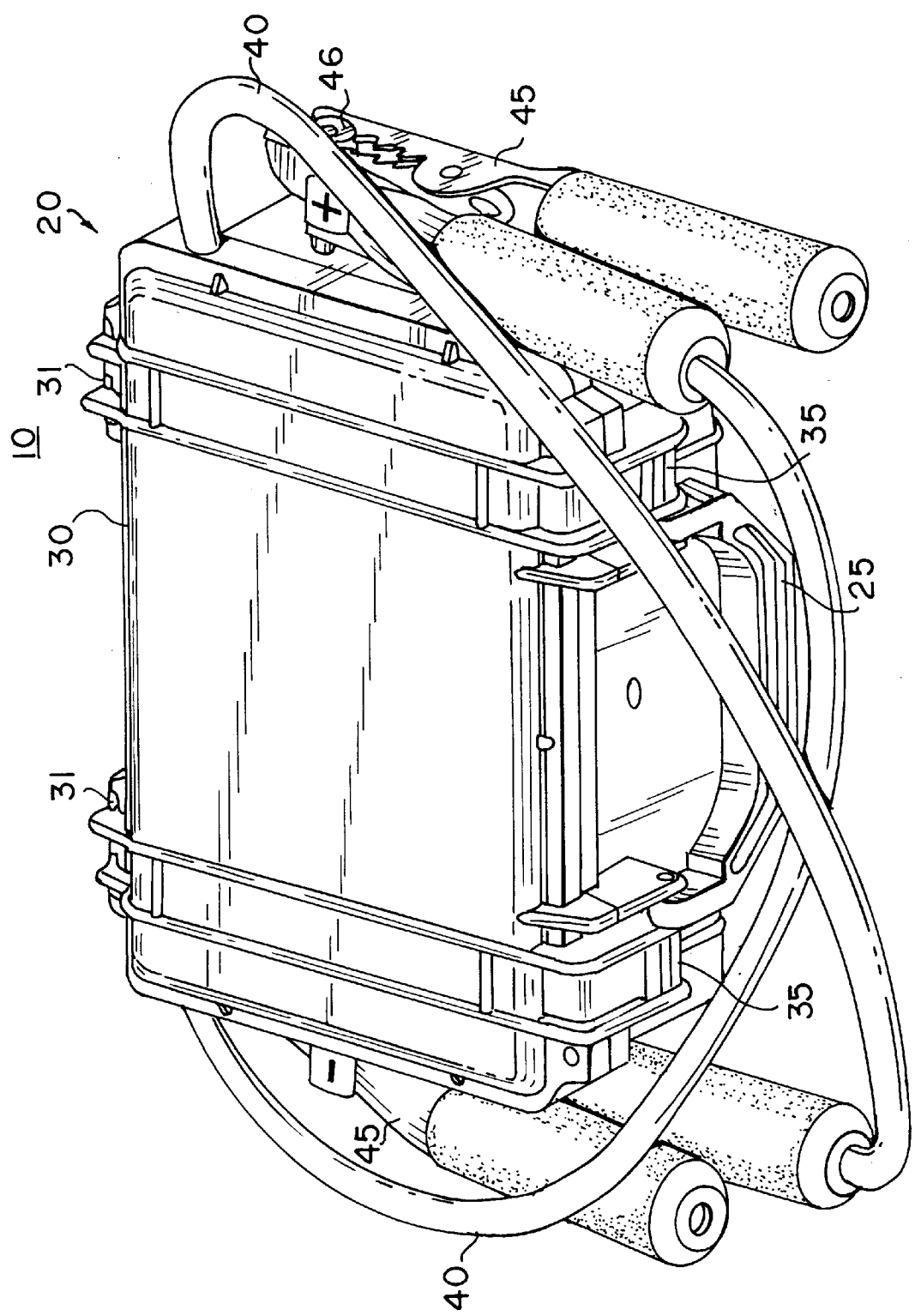
FIG. 1 is a perspective view of an embodiment of a portable jumpstart battery pack unit with the enclosure closed.

Referring to FIGS. 1–4, there is illustrated a battery pack unit, generally designated by the numeral 10, including a battery 11 disposed in a portable, clamshell-type housing 20. The battery 11 may be a lead-acid battery of the thin metal film-type, and may be of a type sold by Johnson Controls, Inc. under the trade designation "INSPIRA." Foam spacer blocks 12, 13 and 14 may be provided to snugly position the battery 11 in the housing 20 without shifting, rattling or vibration. Also disposed in the housing 20 is a printed circuit board 15 (FIG. 2), on which is mounted a monitoring circuit 50, to be described more fully below, which includes a coaxial charger jack 16 for coupling to an associated battery charging apparatus (not shown).

Figure 4:
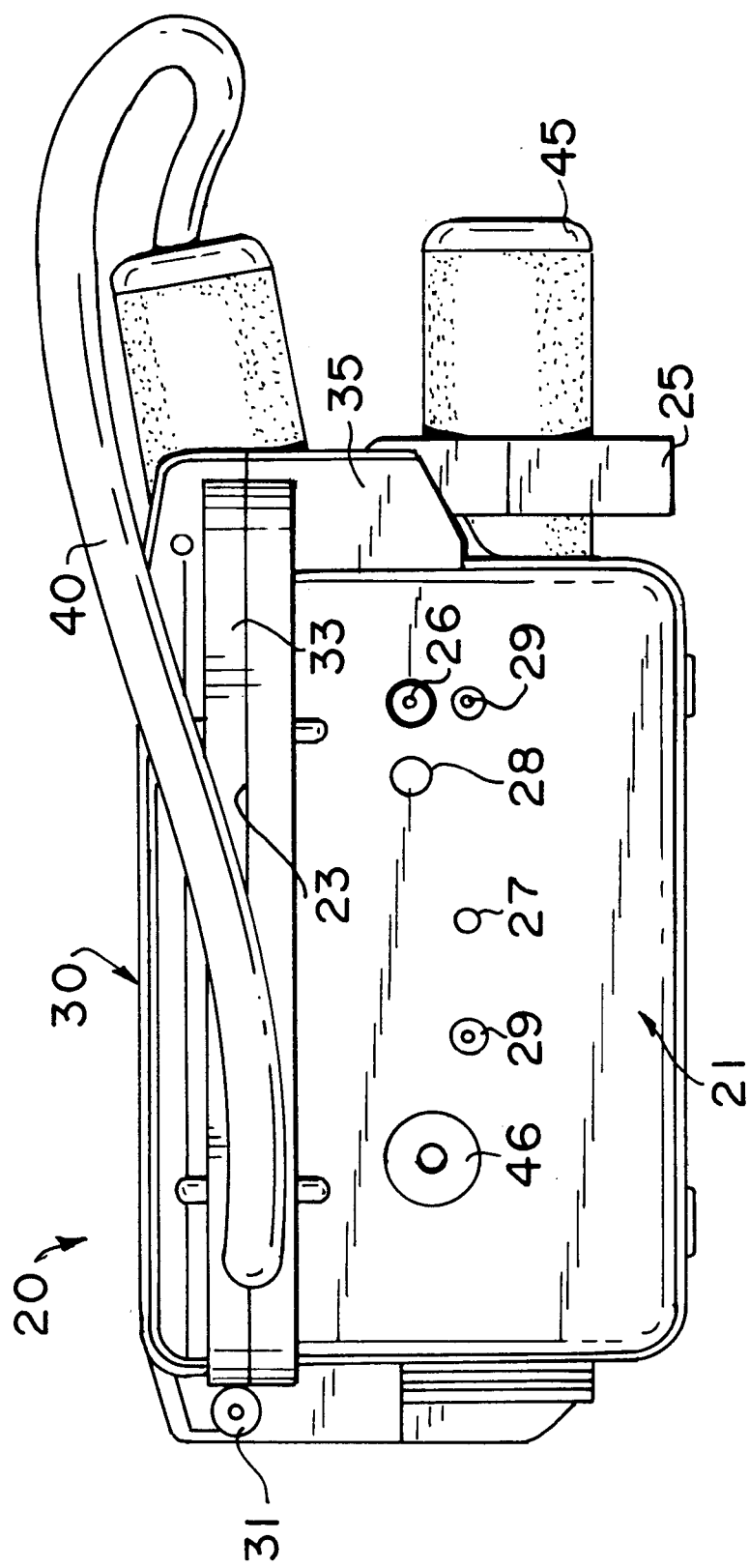
FIG. 4 is a side elevational view of the left-hand side of the unit of FIG. 1, with the associated battery clamp removed.

The housing 20 may be a modified form of a type of case sold by Chemplex Controls under the trade designation "PELICAN," and may be molded of a suitable plastic material. The housing 20 includes an open-top base 21 and an open-bottom cover 30 hingedly interconnected for movement between a closed condition, illustrated in FIGS. 1 and 4, and an open condition, illustrated in FIGS. 2 and 3. In its closed condition, the housing 20 is generally in the shape of a rectangular parallelepiped. The base 21 defines therein a receptacle 22 (see FIG. 2) and has a generally rectangular upper edge 23 having formed therein at opposite sides thereof adjacent to the rear end thereof, two generally semi-cylindrical cable notches 24. A handle 25 is pivotally mounted on the front wall of the base 21. Formed through the left-hand side wall of the base 21, as viewed in FIG. 4, is a charger opening 26 for providing access to the charger jack 16 (FIG. 2), as well as apertures 27 and 28, respectively, for an audible annunciator and for viewing an LED on the PC board 15. Formed through the same side wall are openings 29 for suitable fasteners to fixedly secure the printed circuit board 15 in place.

Figure 2:
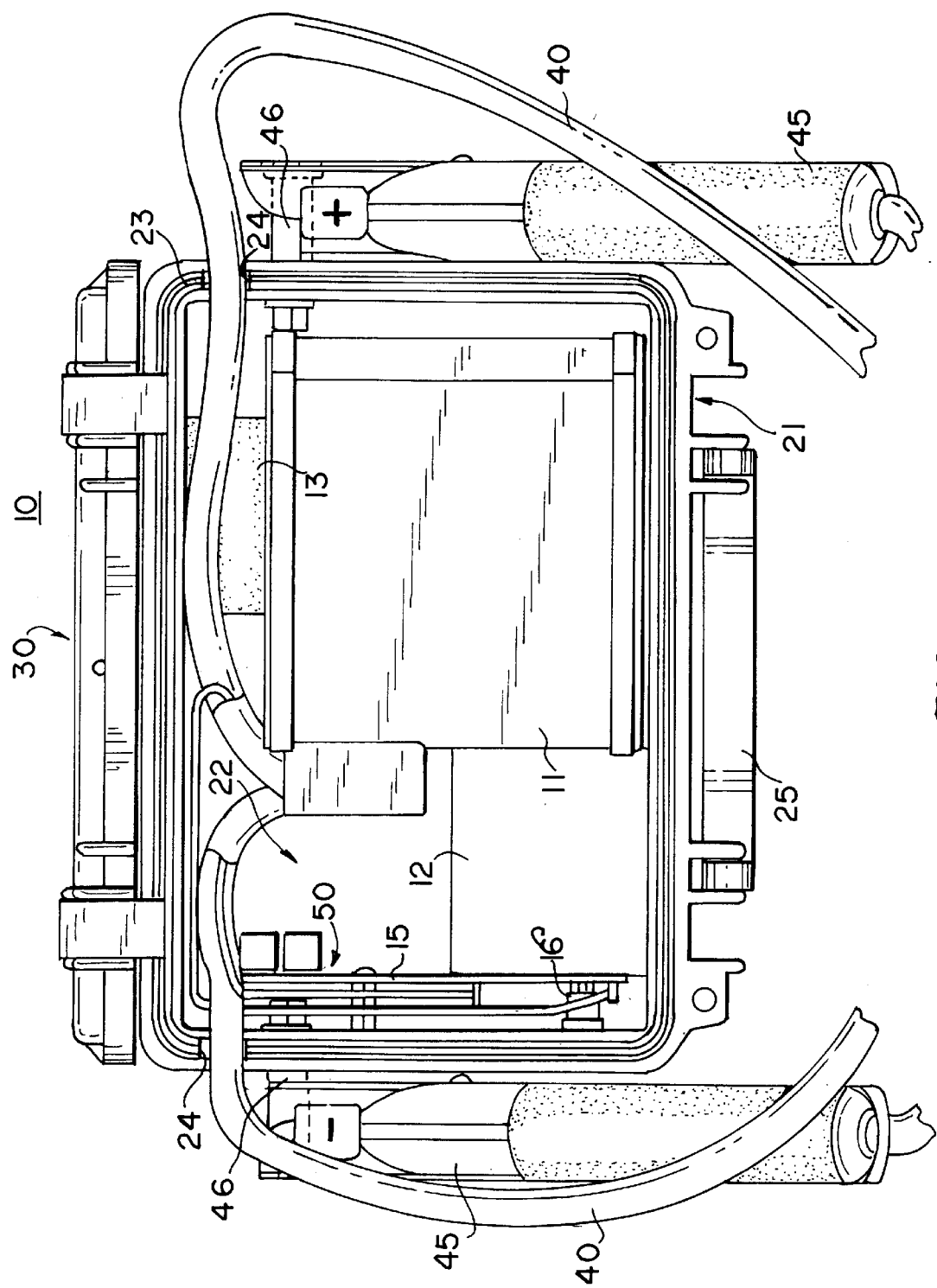
FIG. 2 is a top plan view of the unit of FIG. 1, with the enclosure open.
Figure 3:
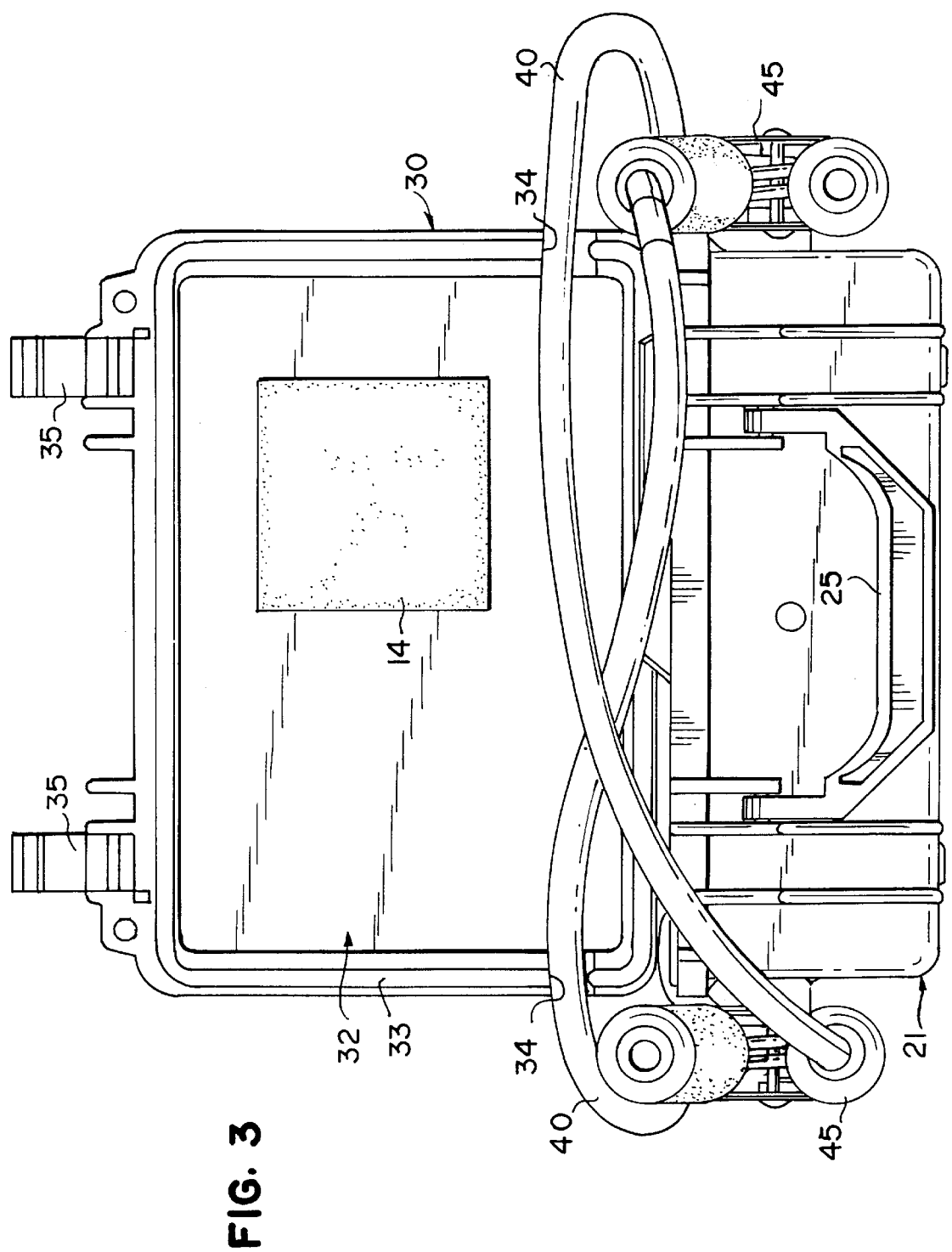
FIG. 3 is a front elevational view of the unit of FIG. 2.

The cover 30 is hingedly connected to the base 21 by hinges 31, and defines an open-bottom receptacle 32 (see FIG. 3) which is much shallower than the receptacle 22 in the base 21, and cooperates therewith in the closed condition of the housing 20 to define an interior space or compartment. The cover 30 has a generally rectangular lower edge 33 in which are formed, respectively along the opposite sides thereof adjacent to the rear edge thereof, two semi-cylindrical cable notches 34. Latches 35 are provided on the front wall of the cover 30 for engagement with associated keepers on the base 21 for latching the housing 20 in its closed position. As can be seen in FIG. 2, the spacers 12 and 13 are disposed in the base receptacle 22, respectively along top and side edges of the battery 11, while the spacer 14

(FIG. 3) is disposed in the cover receptacle 32, being fixedly secured therein by suitable means, and being of a thickness so as to engage the upper surface of the battery 11 when the housing 20 is in its closed condition.

Respectively connected to positive and negative terminals of the battery 11 are two cables 40, which respectively are seated in the cable notches 24 and extend outwardly of the housing 20, respectively terminating in cable clamps 45 of known construction, for clamping respectively onto the positive and negative terminals of an associated battery of an automotive vehicle to be jump started. It will be appreciated that, when the housing 20 is in its closed condition, the cable notches 24 in the base respectively cooperate with the cable notches 34 in the cover to form cable openings for snugly accommodating the cables 40. When not in use, the cable clamps 45 are respectively clamped onto posts 46, which respectively project laterally outwardly from the opposite side walls of the base 21, being fixedly secured thereon, as by suitable fasteners.

Figure 5:
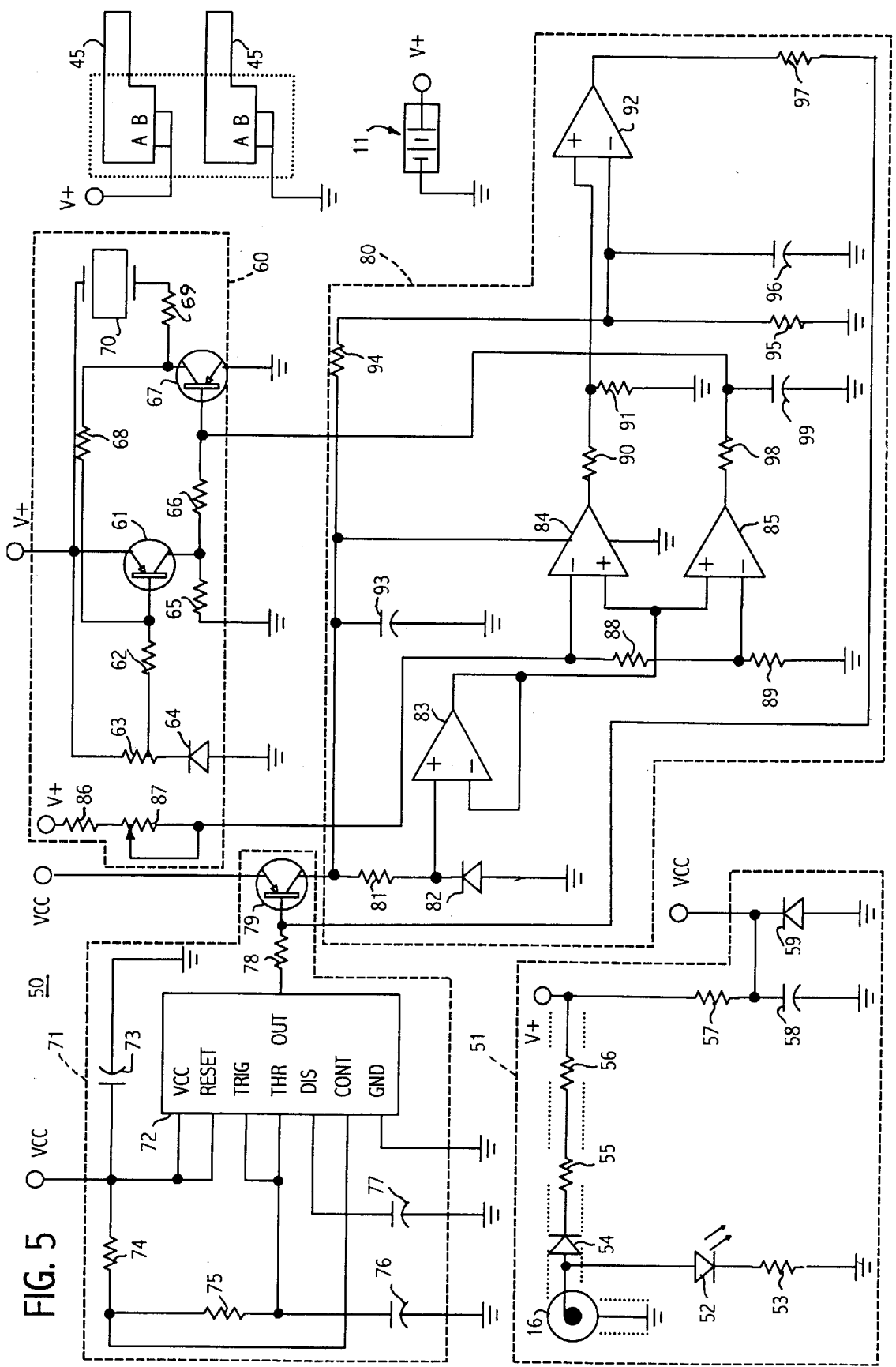
FIG. 5 is an electrical schematic diagram of the circuitry of the unit of FIG. 1.

Referring now to FIG. 5, the monitoring circuit 50 includes a power supply and charger input circuit 51, which includes the charger jack 16. More specifically, the center or ungrounded terminal of the charger jack 16 is connected to the anode of an LED 52, the cathode of which is connected through a resistor 53 to ground, i.e., the negative terminal of the battery 11. The center terminal of the charger jack 16 is also connected to the anode of a diode 54, the cathode of which is connected through resistors 55 and 56 to the positive terminal of the battery 11, designated V+. A resistor 57 and a capacitor 58 are connected in a series across the terminals of the battery 11. The junction between the resistor 57 and the capacitor 58 is connected to the cathode of a Zener diode 59, the anode of which is grounded. A VCC supply voltage is provided at the cathode of the Zener diode 59.

The monitoring circuit 50 also includes an over-voltage alarm circuit 60, which includes a transistor 61 having its emitter connected to the positive terminal of the battery 11, and its base connected through a resistor 62 to the wiper of a potentiometer 63, connected to the cathode of a Zener diode 64, the anode of which is connected to ground. The collector of the transistor 61 is connected to ground through a resistor 65 and is connected through a resistor 66 to the base of a transistor 67, the emitter of which is grounded and the collector of which is connected through a resistor 68 to the base of the transistor 61. The collector of the transistor 67 is also connected through a resistor 69 to one terminal of a transducer 70, the other terminal of which is connected to the resistor 63 and the positive terminal of the battery. The transducer 70 may be any of a number of suitable audible annunciators.

The monitoring circuit 50 also includes a timer circuit 71, which includes an integrated circuit ("IC") timer 72, which may be an LM555CNB. The VCC supply is connected to the VCC and RESET terminals of the IC72, these terminals also being connected through a capacitor 73 to ground, and through the series connection of resistors 74 and 75 and a capacitor 76 to ground. The junction between the resistor 75 and the capacitor 76 is connected to the trigger and threshold terminals of the IC72, while the junction between the resistors 74 and 75 is connected to the discharge terminal of the IC72. The control terminal of the IC72 is connected to ground through a capacitor 77. The output terminal of the IC72 is connected through a resistor 78 to the base of a transistor 79, the emitter of which is connected to the VCC supply, and the collector of which is connected to a low-voltage comparator circuit 80.

More particularly, the circuit 80 includes a resistor 81 and a Zener diode 82 connected in series between the collector of the transistor 79 and ground. The cathode of the diode 82 is connected to the non-inverting input terminal of an operational amplifier ("OP AMP") 83, the output of which is connected to its inverting input terminal and to the non-inverting input terminals of OP AMPS 84 and 85. Connected across the terminals of the battery 11 is a voltage divider including a resistor 86, a potentiometer or variable resistor 87, a resistor 88 and a resistor 89. The junction between the potentiometer 87 and the resistor 88 is connected to the inverting input terminal of the OP AMP 84, while the junction between the resistors 88 and 89 is connected to the inverting input terminal of the OP AMP 85. The output of the OP AMP 84 is connected to ground through resistors 90 and 91, the junction therebetween being connected to the inverting input terminal of an OP AMP 92. The collector of the transistor 79 is connected to ground through a capacitor 93 and through a voltage divider including resistors 94 and 95, the junction therebetween being connected to the non-inverting input terminal of the OP AMP 92, which is also connected to ground through a capacitor 96. The output of the OP AMP 92 is connected through a resistor 97 to the base of the transistor 79. The output of the OP AMP 85 is connected through a resistor 98 to the base of the transistor 67, which base is also connected to ground through a capacitor 99. The OP AMPS 83–85 and 92 may all be portions of a common integrated circuit, such as a TLC274, the supply terminal of which is connected to the VCC supply. The circuits 60 and 80 cooperate to form a state-of-charge monitor.

The power supply and charger input circuit 51 provides a means of safely charging the battery 11, and protects sensitive circuitry from voltage spikes. Jack 16 receives charging voltage from either a wall-mounted charger or a plug charger connected to the cigarette lighter of the associated vehicle. The rest voltage of the battery 11 may be higher than the rest voltage of the associated automotive battery so that, if left connected, the battery 11 would tend to discharge into the automotive battery through a cigarette lighter plug. The diode 54 prevents this from happening. Resistors 55 and 56 prevent high current inrushes, which could blow fuses in a vehicle used to charge the battery 11 through a cigarette lighter plug. The LED 52 lights in the presence of a charge voltage from any source, with current limiting by the resistor 53, the LED being visible through aperture 28 (FIG. 4). The combination of the resistor 57, the capacitor 58 and the Zener diode 59 form a protective network that suppresses high voltage spikes, which might otherwise damage the integrated circuits.

Under normal, non-charging conditions, the voltage of the battery pack battery 11 will be between 12.8 volts and 13.1 volts, well below the voltage rating of the Zener diode 64, which is preferably 15.0 volts ±5%. In this normal, at rest condition, the total current draw of the circuit is approximately 190μA. When the battery 11 is being charged, its voltage will rise above 13.1 volts. If the charging method is applying an inappropriately high charging voltage, the battery's voltage could rise above 16.5 volts, which could lead to battery overheating and failure. As the battery voltage exceeds the threshold voltage of the Zener diode 64, the excess voltage will develop across the potentiometer 63. This potentiometer is adjusted such that transistor 61 will turn ON if the battery voltage exceeds 16.5 volts. When the voltage at the wiper of the potentiometer 63 exceeds the threshold value of the transistor 61, typically about 0.7 volts, the base-emitter junction of the transistor 61 conducts through the resistor 62 as a current limiter, causing the collector-emitter junction to conduct.

With transistor 61 ON, current flows through the resistor 65, bringing the collector of the transistor 61 from zero volts towards V+. When the voltage across the resistor 65 exceeds the threshold value of the transistor 67, its base-emitter junction conducts through the resistor 66 as a current limiter, turning ON the transistor 67. With the transistor 67 ON, current flows through the audible annunciator 70 and the current-limiting resistor 69, causing the audible annunciator 70 to emit a warning tone through aperture 27 (FIG. 4). Conduction of the base-emitter junction of the transistor 67 also provides positive feedback to the base of the transistor 61 through the resistor 68, forcing the transistor 61 into full conduction or saturation. This prevents a condition wherein the volume of the audible annunciator 70 transitions through a gradually increasing volume as the battery voltage transfers from below 16.5 volts to above 16.5 volts.

Once the voltage at the wiper of the potentiometer 63 falls below the threshold voltage of the transistor 61, the feedback through the resistor 68 cannot sustain the transistor 61 ON, and the circuit 60 turns OFF.

The timer circuit 71 administers a power pulse of approximately 400 ms duration, repeated every 35 seconds. This is done to conserve battery power by powering the IC of the low-voltage comparator circuit 80 only briefly. The momentary power causes, in effect, the comparator circuit to "check" for low battery voltage every 35 seconds. The capacitor 76 and the resistors 74 and 75 establish the timer's astable operation, and set the ON time at 400 ms and OFF time at 35 seconds. Capacitor 73 provides noise immunity to the power supply pins VCC and ground. Capacitor 77 stabilizes the control terminal of the timer IC 72. The output pin drives the transistor 79 through the current-limiting resistor 78.

The low-voltage comparator circuit 80 determines if the voltage of the battery 11 is below a safe storage level, and alerts the user if it is. The circuit includes two set points: at 12.4 V, where charging of the battery is needed, and again at 12.0 V, where immediate attention is required.

The admittance of current through transistor 79 powers the OP AMP integrated circuit, as well as the voltage reference diode 82, through current limiting resistor 81. The 1.250 V reference is buffered through OP AMP 83, configured as a unity voltage gain current amplifier, for stability. This reference voltage is applied to the positive inputs OP AMPS 84 and 85, configured as two comparators. The voltage divider circuit of resistors 86–89 causes the negative input of OP AMP 85 to exceed the reference voltage when the battery voltage is above 12.40 V, and causes the negative input of OP AMP 84 to exceed the reference voltage when the battery voltage is above 12.00 V. As a result, the output of OP AMP 85 is only HI if the battery voltage is less than 12.40 V, and the output of OP AMP 84 is only HI if the battery voltage is less than 12.00 V.

A HI at the output of OP AMP 85, through current limiting resistor 98, turns ON transistor 67 (of the over-voltage alarm circuit 60), causing the audible annunciator 70 to sound. A HI at the output of OP AMP 84 is halved at the voltage divider of resistors 90 and 91, and this voltage (about 5.5 V), is applied to the negative input of OP AMP 92, causing a LO at its output. This LO, through current limiting resistor 97, keeps transistor 79 ON, even after the timer output goes HI. This LO is transient, however, because resistors 94 and 95 and capacitor 96 form an R-C network that begins charging when transistor 79 turns ON. After about 1.5 seconds, the voltage at the positive input to OP AMP 92 exceeds that of the negative input, and the output goes HI.

The result of all this is that if the battery voltage falls below 12.4 V, the circuit emits an audible tone of about 400 ms duration, each 35 seconds. If the battery voltage falls below 12.0 V, the circuit emits an audible tone of about 1500 ms duration, each 35 seconds.

Capacitor 99 slows the response of the transistor 67 to transient changes at the output of OP AMP 85, reducing "click" sounds at voltages above alert levels. Capacitor 93 filters noise from the power supply line for the OP AMP IC.

The matter set forth in the foregoing description and accompanying drawings is offered by way of illustration only and not as a limitation. While a particular embodiment has been shown and described, it will be obvious to those skilled in the art that changes and modifications may be made without departing from the broader aspects of applicants' contribution. The actual scope of the protection sought is intended to be defined in the following claims when viewed in their proper perspective based on the prior art.

We claim:

1. A portable battery jump start unit comprising:
   a portable clamshell-type housing having a base and a cover hingedly connected together for movement between open and closed conditions and cooperating to define an interior space,
   a battery disposed in the interior space and having terminals,
   two cable openings in the housing,
   two cables respectively connected to the battery terminals and extending outwardly through the openings,
   two clamp connectors respectively connected to distal ends of the cables outside the housing, and
   a charger jack in the housing connected to the battery terminals and adapted for connection to an associated charger connector while the housing is in its closed condition.

2. The unit of claim 1, wherein the housing is formed of plastic.

3. The unit of claim 1, and further comprising two posts respectively projecting laterally outwardly from opposite sides of the housing.

4. The unit of claim 1, wherein the base has an upper edge and the cover has a lower edge, the upper edge having two spaced-apart substantially semi-cylindrical first recesses formed therein and the lower edge having two spaced-apart substantially semi-cylindrical second recesses formed therein, the second recesses respectively cooperating with the first recesses for forming the openings when the housing is in its closed condition.

5. The unit of claim 1, wherein one of the base and the cover includes keeper structure and the other includes latch structure releasably engageable with the keeper structure for retaining the housing in its closed condition.

6. The unit of claim 1, wherein the jack is disposed in the base.

7. The unit of claim 1, wherein the battery is a lead-acid battery.

8. The unit of claim 1, and further comprising monitoring circuitry including a printed-circuit board disposed in the interior space and connected to the battery terminals and including a visible indicator, and a first aperture in the housing disposed for viewing the indicator therethrough.

9. The unit of claim 8, wherein the monitoring circuitry includes a state-of-charge monitor.

10. The unit of claim 9, wherein the state-of-charge monitor includes a low voltage detection circuit and an over-voltage detection circuit.

11. The unit of claim 10, wherein the monitoring circuitry, includes a timer for periodically activating the state-of-charge monitor.

12. The unit of claim 8, wherein the visible indicator is a light-emitting diode.

13. The unit of claim 8, wherein the monitoring circuitry includes an audible indicator, and a second aperture in the housing disposed to facilitate hearing the audible alert.

14. A housing for a portable jump start unit comprising:
   a box-like open-top base,
   a box-like open-bottom cover hingedly connected to the base for movement between open and closed conditions in a clamshell-type fashion for cooperation with the base to define an interior space,
   two openings in the housing dimensioned to permit cables to be disposed therethrough, and
   two posts carried by the housing and projecting outwardly therefrom.

15. The housing of claim 14, wherein each of the base and the cover is formed of plastic.

16. The housing of claim 14, wherein the posts are respectively disposed at opposite ends of the base.

17. The housing of claim 14, wherein the openings are respectively disposed at opposite ends of the housing.

18. The housing of claim 17, wherein the base has an upper edge and the cover has a lower edge, the upper edge having two spaced-apart substantially semi-cylindrical first recesses formed therein and the lower edge having two spaced-apart substantially semi-cylindrical second recesses formed therein, the second recesses respectively cooperating with the first recesses for forming the openings when the housing is in its closed condition.

19. The housing of claim 14, wherein one of the base and the cover includes keeper structure and the other includes latch structure releasably engageable with the keeper structure for retaining the housing in its closed condition.

20. The housing of claim 14, wherein the jack is disposed in a forward portion of the base.

21. The housing of claim 14, and further comprising a handle disposed on the base and projecting forwardly therefrom.

* * * * *